United States Patent [19]

O'Hara

[11] Patent Number: 4,560,232
[45] Date of Patent: Dec. 24, 1985

[54] VESSEL WITH HIGH PRESSURE FEEDTHRU

[75] Inventor: Stephen G. O'Hara, Bartlesville, Okla.

[73] Assignee: Phillips Petroleum Company, Bartlesville, Okla.

[21] Appl. No.: 361,167

[22] Filed: Mar. 24, 1982

[51] Int. Cl.[4] .................................. F17C 13/02
[52] U.S. Cl. ..................................... 339/268 R; 220/3
[58] Field of Search ............ 339/268 R, 268 S, 263 R, 339/94 R, 94 A, 94 C; 285/175, 393, 332, 334.1; 220/3

[56] References Cited

U.S. PATENT DOCUMENTS

| 1,441,138 | 1/1923 | Westervelt | 285/393 X |
| 1,527,106 | 2/1925 | Alcocer et al. | 339/268 R |
| 1,732,235 | 10/1929 | Joyce | 285/393 X |
| 3,348,570 | 10/1967 | Nealy | 285/175 X |

FOREIGN PATENT DOCUMENTS 2445902  4/1976  Fed. Rep. of Germany ...... 285/332

Primary Examiner—Z. R. Bilinsky
Attorney, Agent, or Firm—French & Doescher

[57] ABSTRACT

A high pressure vessel is provided with a hermetic feedthru assembly from the inside, i.e. from the high pressure side. Specifically and preferably, pressure fittings employing the principle of cone and thread for sealing can be employed. Electrical, optical and fluid connectors are contemplated.

2 Claims, 2 Drawing Figures

VESSEL WITH HIGH PRESSURE FEEDTHRU

BACKGROUND OF THE INVENTION

This invention relates to vessels subjected to significant pressure differentials between the inside and the outside of the vessel. More specifically, the invention relates to such vessels provided with feedthru means that allow communication with the interior of the vessel while maintaining the high pressure differential.

It is a generally recognized problem in the art that vessels subjected to significant pressure differentials between the outside and the inside need specifically designed feedthru means for such connections as electrical connections, optical connections or fluid communication from the inside to the outside of the vessel. Such feedthru means may cause leaks and hazards in the operation of such vessels.

THE INVENTION

It is one object of this invention to provide a vessel as described having feedthru means that are highly reliable.

Another object of this invention is to provide a high pressure vessel with a substantially safe feedthru means for electrical, optical or fluid communication between the exterior and the interior of the vessel.

Figure 1:
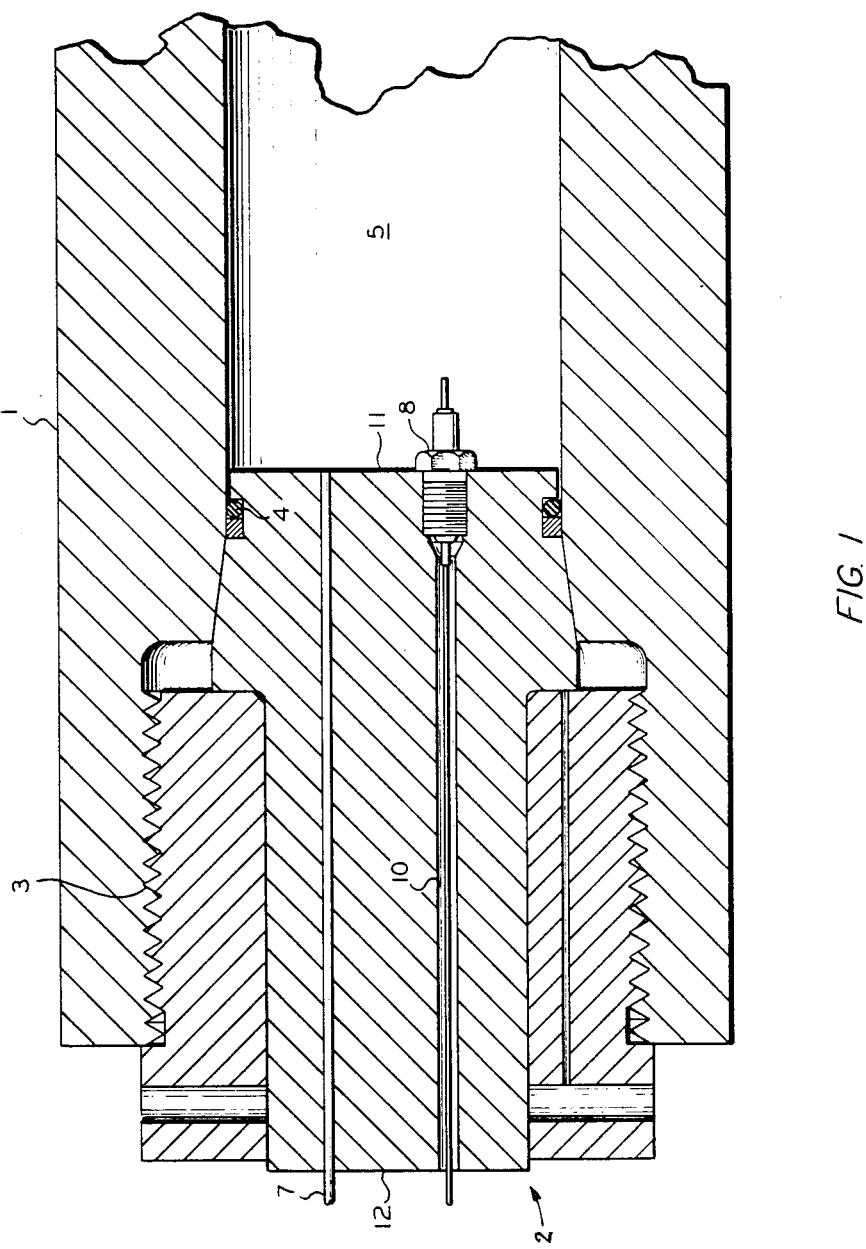
Figure 2:
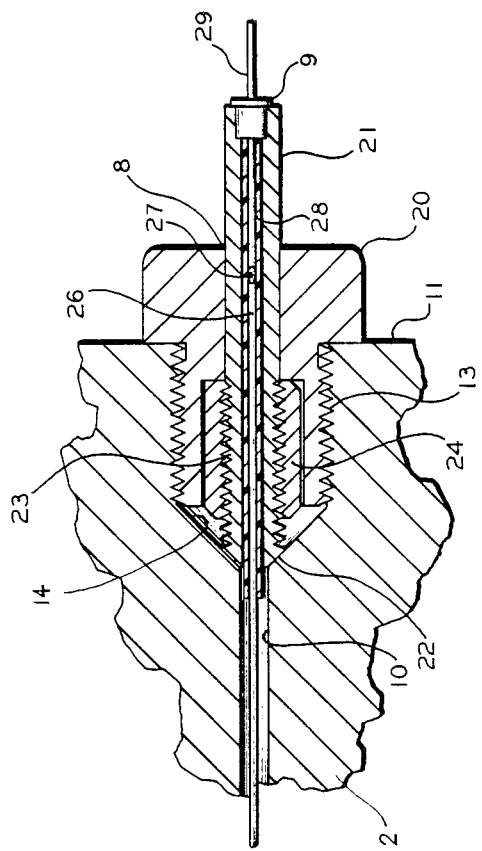

These and other objects, advantages, details and embodiments of this invention will become apparent to those skilled in the art from the following detailed description of the invention, appended claims and the drawing in which FIG. 1 is a schematic cross-sectional view of a vessel in accordance with this invention showing the feedthru means, and FIG. 2 is an enlarged cross-sectional view of the feedthru means of this invention.

In accordance with this invention, a pressurizable vessel is provided which comprises a housing wall defining a chamber. The housing wall includes a wall section which has a low pressure surface and a high pressure surface, the low pressure surface being the outside and the high pressure surface being the inside surface. The wall section is provided with at least one opening therethrough for at least one connector connecting the inside and the outside of the vessel. This connector can be an electrical, an optical or a fluid connector such as a simple wire, an optical fiber or a thin tube.

The feedthru means provided with the vessel of this invention comprise a closure means which is separate from and non-integral with the wall section mentioned. The closure means is attachable and detachable from the wall section at or through the inside or high pressure surface of this section. The closure means have the connector mentioned above therethrough thereby establishing the electrical, optical or fluid conduit connection between the chamber in the vessel and the outside of the vessel. The connector is hermetically sealed into the closure means to prevent any fluid flow around the connector. The closure means further comprises sealing for fluid tight, non-integral sealing of the closure means at or through the inside surface of the wall section. Furthermore, holding means are provided for holding the closure in tight but non-integral connection with the wall section.

In accordance with this invention the pressurizable vessel is provided with a high pressure feedthru assembly at the inside of the vessel. The feedthru assembly can be basically in whole or in part commercially available elements.

In accordance with a preferred embodiment of this invention, the wall section mentioned is detachable from the remainder of the housing wall and forms no integral part therewith. This wall section can be designed for a screw connection, a bolt connection or a clamp connection with the rest of the housing wall.

The pressurizable vessel is provided with fluid conduit means for the introduction of fluid into the vessel.

Yet further details of this invention will become apparent from the following description of the drawings.

FIG. 1 schematically shows a cross-section of a pressurizable vessel. The vessel comprises a main body 1 surrounding an essentially empty chamber in which the user of the vessel carries out experiments or tests. The vessel is closed by an end section 2 which is held in place by threads 3. An O-ring 4 seals the interior 5 of the vessel from unintentional fluid communication with the outside. The vessel can be pressurized, e.g. via conduit 7 which is a high presssure steel conduit which is sealed or otherwise tightly attached to the end section 2.

In accordance with this invention the pressurizable vessel is provided with at least one hermetically sealed feedthru connector assembly unit 8. This feedthru unit is shown in more detail in FIG. 2. The end section 2 has an opening 10 therethrough which, from the high pressure inside 11 of end section 2 to the low pressure outside 12 of end section 2 is shaped as follows. The inside or high pressure side has a threaded hole 13. Following the threaded hole, a tapered section 14 is provided for which is followed by opening 10 to the outside or low pressure side 12 of end section 2.

Into the opening 10 a high pressure gland nut 20 can be threaded. The high pressure gland nut 20 axially surround a conduit section 21. This conduit section 21 is provided with a conically shaped end portion 22. This conically shaped end portion 22 is in fluid tight engagement with the tapered or conically shaped portion 14 of the opening 10. Conduit section 21 is also provided with a threaded area 23 which has a reverse pitch from the threads 13 in the opening in end section 2. On the reverse threaded area 23, a collar 24 is threaded. When the high pressure gland nut 20 is rotated in the threaded section 13 it presses the collar 24 forward which in turn moves the cone section 22 of the conduit 21 into firm engagement with the tapered section 14 of opening 10. The collar 24 which is not integral with the nut 20 and independently rotatable together with the reverse thread arrangement allows fast tightening of conduit section 21 into the tapered seat 14 without rotation of the conduit or the conically shaped end 22.

In the present embodiment, conduit section 21 has fitted at its inner end a hermetically sealed feed-thru connector 9. Connector 9 is commercially available from Hermetic Seal Corp., Rosemead, CA 91770, Type 1006-SS/0-2. Conductor 26 is joined to the conductor 29 of connector 9 via solder or butt welding at junction 27. A polytetrafluorethylene sleave tubing 28 is fitted over conductors 29 and 26 from connector 9 to the extent of conduit 21. The remainder of the bore space of conduit 21 is epoxy encapsulated to provide additional reinforcing to connector 9 and to provide additional sealing to the assembly 8.

Although connector 9 is shown with an electrical feed-thru conductor, it could be fabricated utilizing a fluid conduit, an optical fiber or a bundle of optical fibers.

Reasonable variations and modifications which will become apparent to those skilled in the art can be made from this invention without departing from the spirit and scope thereof.

What is claimed is:

1. Pressurizable vessel comprising
   (a) housing wall means defining a chamber,
   (b) a closure means for said housing wall means, said closure having a low pressure outside surface and a high pressure inside surface, said closure means having at least one opening therethrough for at least one connector means, and at least one additional opening therethrough for connection to a source of pressurizing fluid,
   (c) connector means being separate from and non-integral with but attachable to and detachable from said closure at or through said inside surface, said connector means comprising
      (aa) at least one conductor through said connector means to establish a connection between the chamber and an area outside of the chamber, said conductor being hermetically sealed in said connector means to prevent fluid flow through said connector means around said conductor,
      (bb) sealing means for fluid tight, non-integral sealing of said connector means at or through said inside surface of said closure means,
      (cc) holding means for holding said connector means in tight but non-integral connection with said closure means,
   (d) an O-ring between the closure means and the inside of the housing wall means for a fluid tight, non-integral seal.

2. Vessel in accordance with claim 1 wherein said connector means comprises
   (a) a high pressure gland nut threadable into the high pressure side of the closure means in said opening, said nut axially enclosing
   (b) a reverse threaded conduit section provided with an end cone for sealing engagement with a tapered section of said opening, said reverse threaded conduit section being provided with
   (c) a collar threadably engaged therewith, said collar engaging with said nut such as to press said end cone into said tapered portion of said opening when said nut is rotated into said opening, said apparatus further comprising
   (d) a source of pressurizing fluid connected to the additional opening through the closure means.

* * * * *